United States Patent
Bensberg et al.

(10) Patent No.: US 12,468,679 B2
(45) Date of Patent: *Nov. 11, 2025

(54) STORING AND QUERYING KNOWLEDGE GRAPHS IN COLUMN STORES USING A GLOBAL DICTIONARY

(71) Applicant: SAP SE, Walldorf (DE)

(72) Inventors: Christian Bensberg, Heidelberg (DE); Jonathan Dees, Karlsruhe (DE); Markus Fath, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,039

(22) Filed: May 22, 2024

(65) Prior Publication Data

US 2024/0320208 A1  Sep. 26, 2024

Related U.S. Application Data

(63) Continuation of application No. 17/893,608, filed on Aug. 23, 2022, now Pat. No. 12,019,608.

(51) Int. Cl.
*G06F 16/22* (2019.01)
*G06F 16/21* (2019.01)
(Continued)

(52) U.S. Cl.
CPC ........ *G06F 16/2282* (2019.01); *G06F 16/213* (2019.01); *G06F 16/2255* (2019.01); *G06F 16/2456* (2019.01)

(58) Field of Classification Search
CPC ............ G06F 16/2282; G06F 16/2255; G06F 16/2456; G06F 16/213
See application file for complete search history.

(56) References Cited

U.S. PATENT DOCUMENTS

2006/0235823 A1  10/2006  Chong et al.
2008/0126397 A1   5/2008  Alexander et al.
(Continued)

OTHER PUBLICATIONS

Albahli, Saleh, and Austin Melton. "ohStore: Ontology hierarchy solution to improve RDF data management." The 9th International Conference for Internet Technology and Secured Transactions (ICITST-2014). IEEE, 2014. (Year: 2014).*

(Continued)

*Primary Examiner* — Mohsen Almani
(74) *Attorney, Agent, or Firm* — Sterne, Kessler, Goldstein & Fox P.L.L.C.

(57) ABSTRACT

Various embodiments for a triple integration and querying system with dictionary compression are described herein. An embodiment operates by identifying a table of a database with four or more columns with triple formatted data including one subject column, one predicate column, and two or more object columns. It is determined that a master dictionary is to be generated for the both the subject column and the predicate column based on an identical datatype being used for both columns. A master dictionary including both the unique values from the subject data dictionary and the predicate data dictionary is generated. Values in the subject column and the predicate column are replaced based on the unique values from the master dictionary.

20 Claims, 10 Drawing Sheets

(51) Int. Cl.
  *G06F 16/24*  (2019.01)
  *G06F 16/2455*  (2019.01)

(56) References Cited

U.S. PATENT DOCUMENTS

| | | | |
|---|---|---|---|
| 2011/0225167 | A1 | 9/2011 | Bhattacharjee et al. |
| 2016/0275180 | A1* | 9/2016 | Matskevich ............ G06F 16/93 |
| 2016/0371355 | A1 | 12/2016 | Massari et al. |
| 2019/0392074 | A1 | 12/2019 | Little |
| 2022/0358185 | A1 | 11/2022 | Newman |
| 2023/0177037 | A1* | 6/2023 | Das ..................... G06F 16/2433 |
| | | | 707/696 |
| 2023/0359614 | A1* | 11/2023 | Oattes ................ G06F 16/2452 |
| 2024/0070136 | A1 | 2/2024 | Bensberg et al. |

OTHER PUBLICATIONS

Bornea, Mihaela A., et al. "Building an efficient RDF store over a relational database." Proceedings of the 2013 ACM SIGMOD international conference on management of data. 2013. (Year: 2013).*

Guo, Xintong, Hong Gao, and Zhaonian Zou. "Leon: A distributed rdf engine for multi-query processing." International Conference on Database Systems for Advanced Applications. Cham: Springer International Publishing, 2019. (Year: 2019).*

Sarika, Jain. "Semantic Technologies as Enabler." Understanding Semantics-Based Decision Support. Chapman and Hall/CRC, 2021. 21-56. (Year: 2021).*

Unpublished U.S. Appl. No. 17/893,592, filed Aug. 23, 2022, entitled "Storing and Querying Knowledge Graphs in Column Stores".

Gupte, Athang, Saumitra Sapre, and Sheetal Sonawane. "Knowledge graph generation from text using neural machine translation techniques." 2021 International Conference on Communication information and Computing Technology (ICCICT). IEEE, 2021. (Year: 2021).

Santana, Luiz Henrique Zambom, and Ronalda dos Santos Mello. "An analysis of mapping strategies for storing RDF data into NoSQL databases." Proceedings of the 35th Annual ACM Symposium on Applied Computing. 2020. (Year: 2020).

Sagi, Tomer, et al. "A design space for RDF data representations." The VLDB Journal 31.2 (2022): 347-373. (Year: 2022).

* cited by examiner

| | subject | predicate | object_literal | object_literal language | object_integer | object_float | object_double | object_boolean | object_date | object_geo | object |
|---|---|---|---|---|---|---|---|---|---|---|---|
| 1 | <http://dbpedia.org/resource/Heidelberg> | <http://www.w3.org/1999/02/22-rdf-syntax-ns#label> | Heidelberg | de | NULL | NULL | NULL | NULL | NULL | NULL | NULL |
| 2 | <http://dbpedia.org/resource/Heidelberg> | <http://dbpedia.org/property/averageTemperature> | NULL | NULL | NULL | NULL | 11.712 | NULL | NULL | NULL | NULL |
| 3 | <http://dbpedia.org/resource/Heidelberg> | <http://depedia.org/property/country> | NULL | NULL | NULL | NULL | NULL | NULL | NULL | NULL | <http://depedia.org/resource/Germany> |
| 4 | <http://dbpedia.org/resource/Heidelberg> | <http://dbpedia.org/property/coordinates> | NULL | NULL | NULL | NULL | NULL | NULL | NULL | 0101000000002AA913D0445214089D2DEE00BB34840 | NULL |

FIG. 2

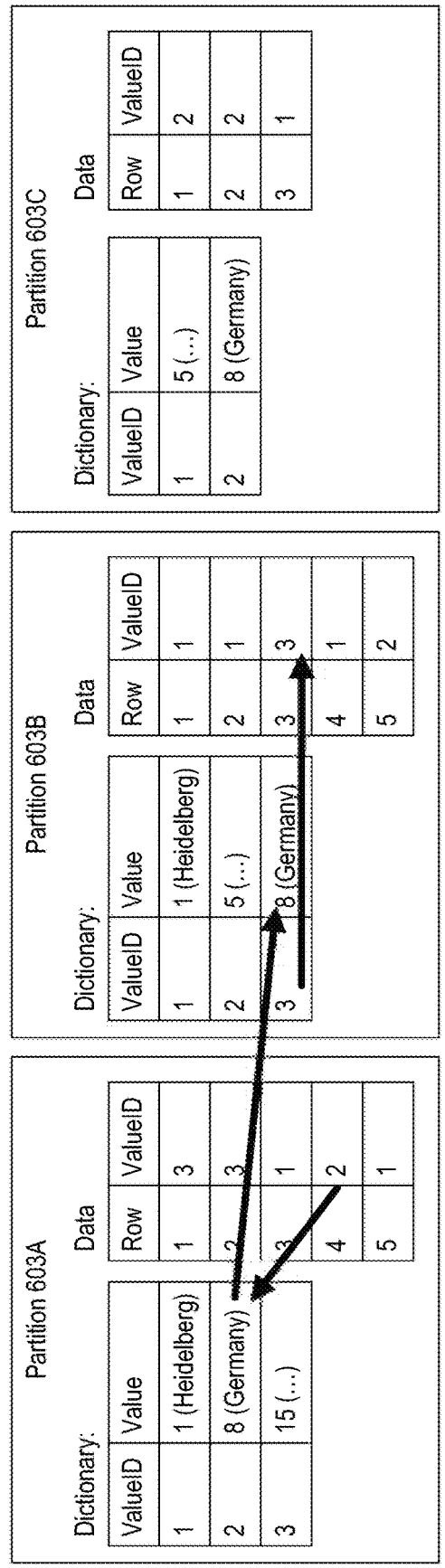
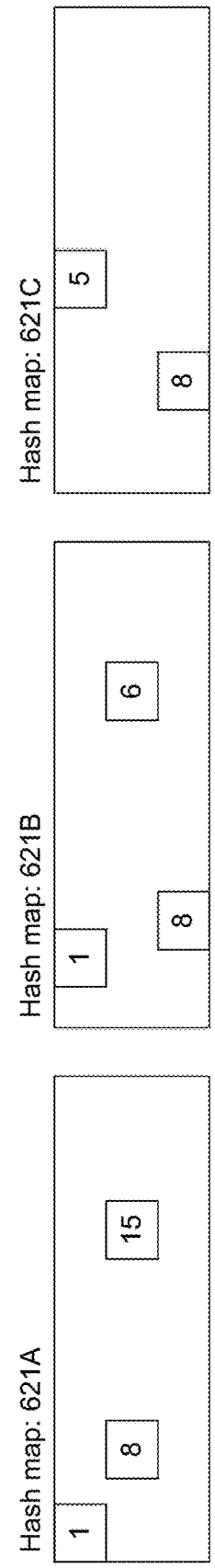
FIG. 6

1000

Table: Customers 1008A

| CustomerID | LastName | FirstName | EMail |
|---|---|---|---|
| 1000 | Smith | Paul | ... |
| 1001 | Walker | John | |
| 1002 | Doe | Sarah | |

Table: Deliveries 1008B

| DeliveryID | CustomerID | Item | DeliveryDate |
|---|---|---|---|
| 8000 | 1000 | Cell Phone | 2022-01-13 |
| 8001 | 1000 | Tablet | 2022-01-13 |
| 8002 | 1002 | SSD | 2022-01-15 |

1011

```
CREATE KNOWLEDGE GRAPH VIEW "myView"
  USING TABLE Customers
    ENTRY IN TABLE FROMS TYPE "sap:customer"
      COLUMN CustomerID TRANSLATES TO PREDICATE "d:customerID"
      COLUMN LastName TRANSLATES TO PREDICATE "d:lastName"
      COLUMN FirstName TRANSLATES TO PREDICATE "d:firstName"
  USING TABLE Deliveries
    ENTRY IN TABLE FORMS TYPE "sap:delivery"
      COLUMN DeliveryID TRANSLATES TO PREDICATE "d:deliveryID"
      COLUMN CustomerID TRANSLATES TO PREDICATE "d:customerID"
      COLUMN Item TRANSLATES TO PREDICATE "d:item"
      COLUMN DeliveryDate TRANSLATES TO PREDICATE "d:deliveryDate"
```

1013

```
SELECT ?customer ?item ?deliveryDate
FROM <myView>
{
  ?customer d:firstName 'Sarah' .
  ?customer d:lastName 'Doe' .
  ?customer a sap:customer .
  ?delivery a sap:delivery .
  ?delivery d:customer ?customer .
  ?delivery d:item ?item .
  ?delivery d:deliveryDate ?deliveryDate
}
```

FIG. 10

STORING AND QUERYING KNOWLEDGE GRAPHS IN COLUMN STORES USING A GLOBAL DICTIONARY

CROSS-REFERENCE TO RELATED APPLICATIONS

This application is a continuation of U.S. patent application Ser. No. 17/893,608 titled "Storing and Querying Knowledge Graphs in Column Stores Using a Global Dictionary", to Bensberg et al., filed Aug. 23, 2022, which is herein incorporated by reference in its entirety This application is related to U.S. patent application Ser. No. 17/893,592 titled "Storing and Querying Knowledge Graphs in Column Stores", to Bensberg et al., filed Aug. 23, 2022, which is herein incorporated by reference in its entirety.

BACKGROUND

Every computing system uses data stored in some form or the other. Often this data organized and stored in a database for which SQL (structured query language) is used to access and query this data. However, when new data is received in a form that does not correspond to the existing table structure of the database, such as data configured for the RDF (resource description framework) data model, multiple data systems must then be used to maintain the different formats of data. These systems may include a first system for maintaining the traditional database data and another separate data system for the RDF data. As can be appreciated maintaining multiple data systems has many drawbacks including increased maintenance costs, additional computing devices that would be necessary, and would require separate queries and additional processing if the data from both systems needs to be queried.

BRIEF DESCRIPTION OF THE FIGURES

The accompanying drawings are incorporated herein and form a part of the specification.

FIG. 2 is a block diagram illustrating an example table used by the triple integration and querying system (TQS), according to some example embodiments.

FIG. 6 is a block diagram illustrating an example operations of TQS directed to joining different partitions by value using a surrogate identifier, according to some example embodiments.

FIG. 10 illustrates an example of two tables of TQS, which are queried with SPARQL, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Every computing system uses data stored in some form or the other. Often this data organized and stored in a database for which SQL (structured query language) is used to access and query this data. However, when new data is received in a form that does not correspond to the existing table structure of the database, such as data configured for the RDF (resource description framework) data model, multiple data systems must then be used to maintain the different formats of data. These systems may include a first system for maintaining the traditional database data and another separate data system for the RDF data. As can be appreciated maintaining multiple data systems has many drawbacks including increased maintenance costs, additional computing devices that would be necessary, and would require separate queries and additional processing if the data from both systems needs to be queried.

Figure 1:
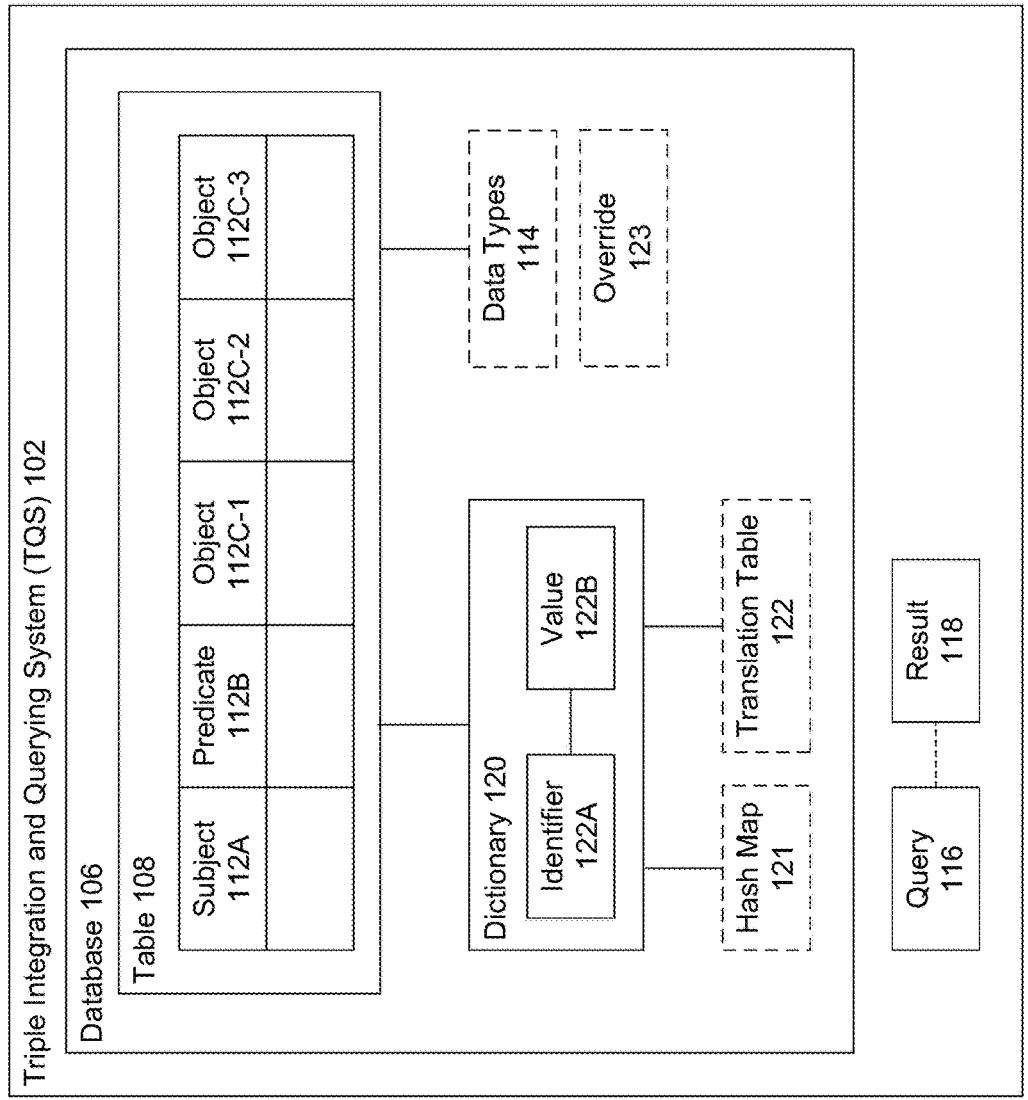
FIG. 1 illustrates a block diagram illustrating a triple integration and querying system (TQS), according to some example embodiments.

FIG. 1 illustrates a block diagram 100 illustrating a triple storage integration and querying system (TQS) 102, according to some example embodiments. In some embodiments, TQS 102 may integrate data of a knowledge graph 110 formatted as a set of triples 104 into a database 106. In some embodiments, this data integration may include creating or using a table 108 designed and/or designated for storing and querying data imported from triples 104.

TQS 102 may provide for rapid data integration of triple 104 formatted data into a database 106. TQS 102 may also require less data maintenance overhead by maintaining all the data within database 106 relative to maintaining multiple data storage systems. Further, by integrating data from triples 104 into a table 108 of database 106, TQS 102 enables a single query 116 to access both the imported triple data and the traditional database data. In some embodiments, TQS 102 may enable a user to execute SPARQL queries or functionality against data from triples 104 as stored in database 106. SPARQL is an example of a RDF query language for querying, retrieving, and/or manipulating RDF formatted data, such as triples 104.

In some embodiments, a triple 104 may be data arranged in the Resource Description Framework (RDF) data model. A triple 104 may include a predicate 104B that indicates a relationship of a subject 104A to an object 104C. For example, a triple 104 may include the data values: New York CityIn USA. The triple 104 may indicate that New York (subject 104A) is a city in (predicate 104B) the country of the USA (object 104C).

Knowledge graph 110 may include a set of multiple triples 104 (as illustrated with multiple boxes representing triples 104). The triples 104 (which may be used to data arranged in a triple format or organization scheme, and may include one or more sets of data stored across various rows of triples) may be arranged in a table format, and the knowledge graph 110 may include any set of data in which at least a subset of the entries are related to each other. For example, the knowledge graph 110 may include triples 104 related to different cities and the countries in which the cities are located in per the example above. In some embodiments, the knowledge graph 110 may also include other data such as the presidents or leaders of various countries, which may include countries both in and not in the set of triples corresponding to the cities. In some embodiments, the knowledge graph 110 may also include other, seemingly unrelated data, such as different models of cars and the names of their manufacturers.

Knowledge graph 110 may be received by TQS 102 for integration of the data from triples 104 into a database 106. In some embodiments, database 106 may include a relational database, such as a column-oriented database. In some embodiments, database 106 may include a set of relational tables with traditional database data stored in those tables (not shown).

In some embodiments, TQS 102 may generate a new table 108 designed or configured for storing the triples 104 of knowledge graph 110. In some embodiments, table 108 may be specifically designed to capture data from triples 104 of knowledge graph 110, and may be referred to as a knowledge graph table. The new table 108 may include, for example, a subject column 112A for storing values of subject 104A, a predicate column 112B for storing values of predicate 104B, and multiple object columns 112C-1, 112C-2, 112C3 (referred to generally together as 112C) for storing values of object 104C.

In some embodiments, the number and types of object columns 112C may be based on the number of datatypes 114 available for data storage and processing in database 106. Datatypes 114 may represent a variety of different datatypes available in database for storing data. Each datatype may constrain or indicate what types of data can be stored in each column of database 106 and may have its own particular memory allocations for storing that type of data. Some example datatypes 114 include integers, real numbers, strings, Booleans, floating point, and other specialized or object-based types of data. As such, each object column 112C may be configured to store data corresponding to a different one of the datatypes 114.

This multi-column store of data from object 104C across specifically configured object columns 112C for different datatypes 114, may enable query processing to be performed on the data from object 104C after it is stored in table 108 (e.g., rather than simply storing the value of object 104C as a string which would make data processing and responding to a query 116 on the data both time and resource intensive, or even impossible in some cases).

In some embodiments, subject column 112A and predicate column 112B may store string values which makes querying information on those columns difficult and resource intensive. As will be described in greater detail below, TQS 102 may generate a dictionary 120 to reduce the memory overhead of these columns 112A and 112B.

In some embodiments, data from object 104C may be transformed or modified prior to being stored in one of the object columns 112C. For example, data from object 104C may include a location in a longitude and latitude type coordinate or locational system. However, object column 112C-3 which may be configured to store spatial values in a particular spatial reference system that is more beneficial for querying and performing other data calculations on database 106 (which may not be able to be performed or performed as efficiently with coordinate information).

For example, there may be another database table with location information stored in the spatial reference system, therefore it may be beneficial to have the new imported locational data from triple 104 to also be stored in the same spatial reference system. As such, during the import processing, TQS 102 may identify the type of data in object 104C as belonging to object column 112C-3 and convert the data of object 104C from longitude, latitude to the spatial reference system used in database 106 and for which object column 112C-3 may be configured to store values. Or, for example, object 104C may include a monetary value in British Pounds, and object column 112C-2 may be configured to store monetary values in US Dollars, so TQS 102 may perform an appropriate data conversion from Pounds to Dollars.

After data has been loaded from the triples 104 of knowledge graph 110 to database 106, a query 116 may be executed on table 108 where the imported and formatted data is stored. In some embodiments, the query may include an SQL, a SPARQL query, or an SQL query with new functionality to account for the storage of triples 104 in table 108, as will be discussed in greater detail below. Database 106 may then return a result 118 of the query 116, which may be provided back to a system, program, or user that initiated the query 116.

In some embodiments, TQS 102 or database 106 may generate one or more dictionaries 120 for table 108. Dictionary 120 may include unique identifiers 120A assigned to unique data values 120B stored in table 108. These unique identifiers 120A may consume less space than the original data values 120B and may be used in table 108 in lieu of the original data values 120B.

In some embodiments, each column of table 108 may include its own dictionary 120. For example, TQS 102 may generate a subject dictionary 120 for subject column 112A, a predicate dictionary 120 for predicate column 112B, and an object dictionary 120 for each of a selected one or more of the object columns 112C.

In some embodiments, TQS 102 may generate master dictionary 120 for a subset of or all of the columns of table 108. For example, TQS 102 determine that subject column 112A and object column 112C are going to be sharing a dictionary 120. Then, for example, TQS 102 may generate a first dictionary 120 for the values 120B stored in subject column 112A. TQS 102 may then use that same first dictionary 120 for object column 112C, in which a previously assigned identifier 120A for a particular value 120B for subject column 112A is reused with column 112C. And only those new values 120B in object column 112C are assigned new identifiers 120A.

For example, if "New York" is a value 120B entry in both the data of subject column 112A and the object column 112C-1, then TQS 102 may use the same identifier 120A for "New York" for both columns 112A, 112C-1. In some embodiments, TQS 102 may generate a different dictionary 120 for each column 112A, 112C-1 in which the identifier 120A is the same in both dictionaries 120. Then, for example, in the master dictionary 120, the identifier 120A for "New York" would be consistent across all the columns of table 108. This consistency may help with compression and improve processing as no translation tables would be necessary across different partitions. In other embodiments, each dictionary 120 may independently assign identifiers 120A, to the same value 120B "New York" may have different identifiers 120A across different dictionaries 120 for table 108.

As will be discussed in greater detail below, in some embodiments, table 108 may be divided into various partitions of data. In some embodiments, each partition TQS 102 may include its own dictionary 120. And as will be discussed in greater detail below, these various partitions may be joined by using a hash map 121 or through generating a translation table 122.

FIG. 2 is a block diagram 200 illustrating an example table 208 used by the triple integration and querying system (TQS) 102, according to some example embodiments. Table 208 may illustrate an example of table 108 of FIG. 1 that may be generated or used by TQS 102 in importing data from triples 104 into database 106. The columns 212A, 212B, and 212C as illustrated for table 208 may correspond to and be examples of the columns 112A-C of table 108.

Table 208 may be an example of data that has been loaded from a set of triples 104 (e.g., triple formatted data) from a knowledge graph 110 into database 106. In the example illustrated, subject column 212A may include data including universal resource indicators (URIs) which may be stored as text or strings, or as a special URI datatype. The predicate column 212B may also include URI or string data. In other embodiments, the subject column 212A and predicate column 212B may each be configured to store different datatypes. In some embodiments, TQS 102 may identify that two columns with the same datatype (e.g., URIs) may share a master dictionary 120.

As illustrated, there are nine example object columns 212C-1 to 212C-9 which may correspond to the nine available datatypes 114 of database 106. In some embodiments, database 106 may use many different datatypes 114, and a subset of those datatypes 114 may be selected for configuring different object columns 212C (which is a number that may be used generally to refer object columns 212C-1 to 212C-8).

As illustrated table 208, TQS 102 may provide NULL values in various object columns 212C that do not have actual data imported from a triple 104. For example, a triple 104 will only have a single value and hence just populate one of the object columns 212C (if there are more object values for one combination of subject and predicate, then more rows may be added). In the object columns 212C in which no data is imported from a triple 104 for that row or record, TQS 102 may provide a NULL value in that column. The NULL value may be used because it consumes very little space in the table and is beneficial during compression-particularly in a column store database.

In the example illustrated, object column 212C-8 may store spatial location of the city of Heidelberg (as indicated in the subject column 212A). However, rather than storing the location of Heidelberg as longitude and latitude as it may have been received from triple 104, TQS 102 may perform a data transformation to compute the spatial values illustrated, which may be compatible with a spatial engine, processor, or program that uses locational data in the indicated spatial format or datatype.

Figure 3:
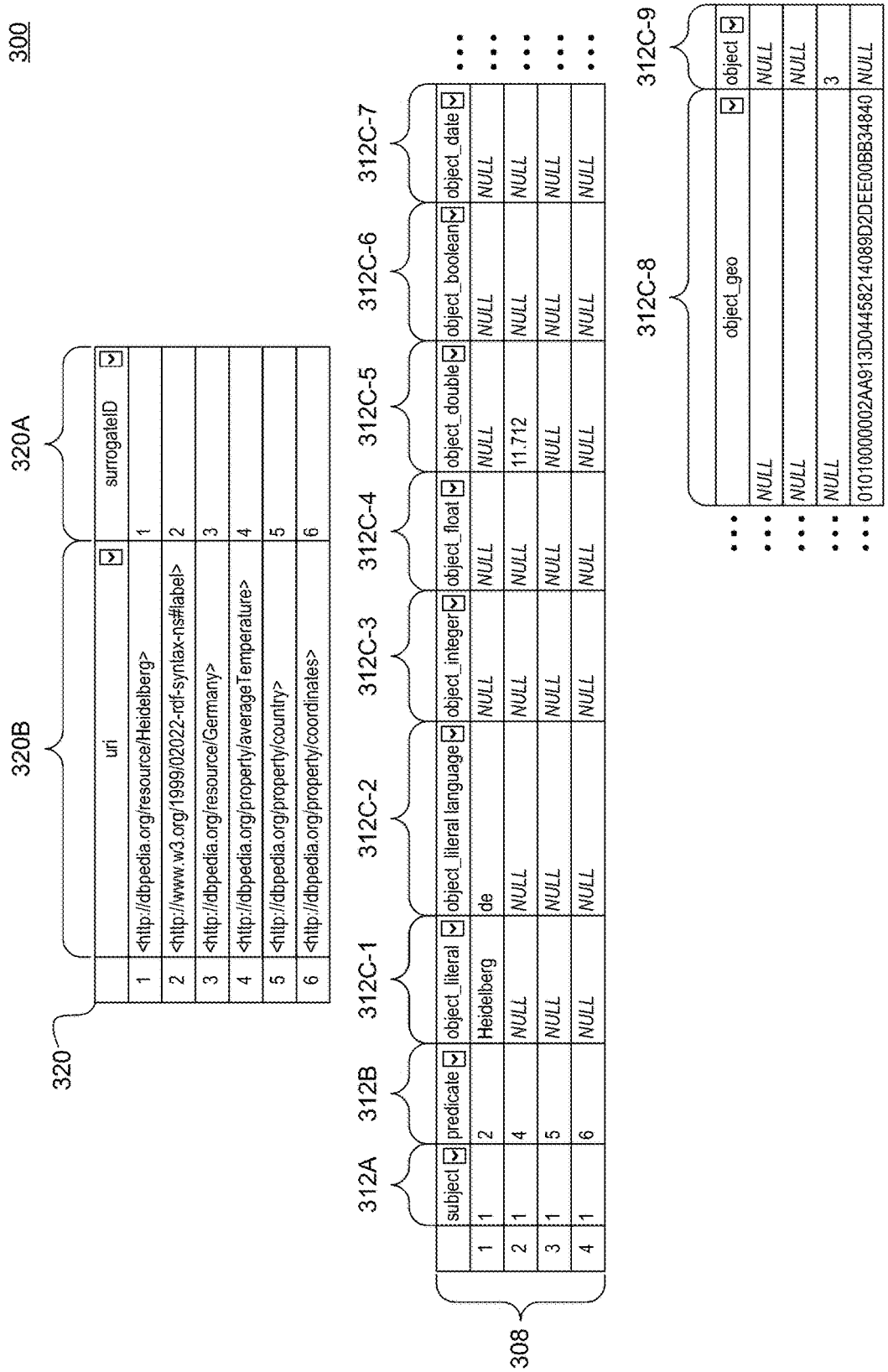
FIG. 3 is a block diagram illustrating an example table used by the triple integration and querying system (TQS) with dictionary compression, according to some example embodiments.

FIG. 3 is a block diagram 300 illustrating an example table 308 used by the triple integration and querying system (TQS) 102 with dictionary compression, according to some example embodiments.

Dictionary 320 may illustrate a shared or master dictionary for both the subject column 312A and predicate column 312B -which may be of the same datatype (e.g., string). Each unique value 320B from the columns 312A and 312B may be assigned its own unique identifier 320A. As illustrated, the unique identifiers 320A may then be used in table 308 to replace the corresponding data values 320B (as illustrated in table 208). Using these dictionary identifiers 320A frees up memory space in table 308, relative to using the original data values 320B and helps improve compression of the table 308.

In some embodiments, TQS 102 may scan the values of various columns 312A-C to identify on which columns to generate a shared or master dictionary 320. For example, if there is a shared datatype (e.g., string), TQS 102 may generate a shared or master dictionary 320. Or, for example, if there are more than a threshold number or percentage of overlapping values, TQS 102 may generate a shared or master dictionary 320 for multiple columns 312A-C. Because there were more than a threshold number of overlapping values 320B in subject column 312A and object column 112C (or predicate column 312B), master dictionary 320 may be generated and used for both columns. In other embodiments, if there overlapping values in one of the object columns 312C, then the dictionary 320 may be generated and used for those selected objects columns 312C as well.

As noted above, using and generating a single master or shared dictionary 320 may save processing time (relative to generating multiple dictionaries 320) and storage space in storing multiple dictionaries 320. A single dictionary 320 may also enable more efficient compression.

In some embodiments, after the columns on which a shared dictionary 320 is to be generated is identified TQS 102 may generate a dictionary for a first one of the columns, and then supplement the dictionary with any new values from the second and/or remaining columns (e.g., while reusing already generated identifiers 320A for previously encountered unique values 320B) for all the columns.

Figure 4:
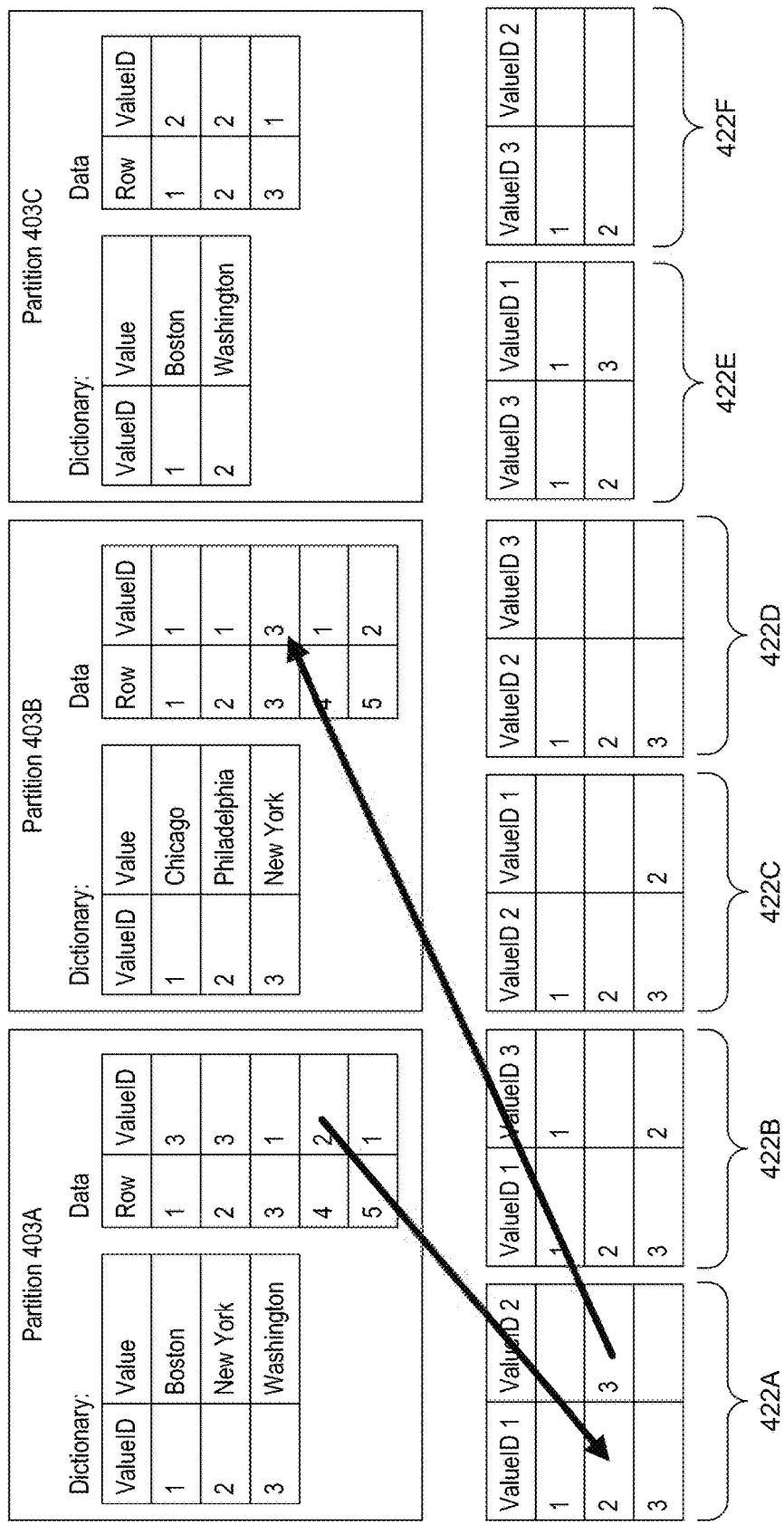
FIG. 4 is a block diagram illustrating an example operations of directed to joining different partitions by an identifier, according to some example embodiments.

FIG. 4 is a block diagram 400 illustrating an example operations of TQS 102 directed to joining different partitions by an identifier 120A, according to some example embodiments. As noted above, the rows of a table 108 may be divided into partitions 403A-403C. In some embodiments, each partition 403A-403C may include unique rows, in other embodiments, the same row may be included in each of multiple different partitions 403A-C.

In some embodiments, TQS 102 may enable direct access to any column and provide multi-level partition on the data of triples 104 stored in table 108. When RDF formatted data is stored in its own RDF repository, it may be required that data access takes the form of predicate and subject in a strict pattern. However, with table 108 loaded with triple data, TQS 102 may enable a user or system to directly access any data, in any of the columns 112A-C without following the format of predicate-subject.

Multi-level partitioning may include partitioning based on any sequence and combinations of the columns 112A-C. For example, in single level partitioning, a partition may include selected data that satisfies a query based on a single column, such as subject column 112A. However, in multi-level partitioning, TQS 102 may partition the data of table 108 based on object column 112C-2, and then partition that data based on subject column 112A, and then even partition that data on predicate column 112B. In some embodiments, TQS 102 may also create an index on any of the columns 112A-C, which may help improve query processing for RDF or triple formatted data loaded into table 108.

In some embodiments, when using partitioning, for a given query, not all partitions may need to be considered if the query filters limit the scope of the query (partition pruning). Moreover, in using partitioning, data that is related may be stored in physical proximity, which may speed up processing. Partitioning does not add any extra artifacts by itself that are costly from a memory consumption perspective; yet it causes auxiliary data structures to be built like the translation tables that will be presented below. Indexes on the other hand are a direct trade-off for administrators between processing speed and memory usage. Given that a column store offers the creation of an index on any column, tuning options exist. (Some special purpose databases for RDF structure their data differently and don't offer indexes.)

In the example illustrated, each partition 403A-C includes its own dictionary (e.g., dictionary 120) and its own data table, set, or collection of values which may be a subset of contiguous or non-contiguous rows from another table 108. As illustrated, rather than storing original values 120B, each table of the partitions 403A-C may include dictionary identifiers 120A which correspond to the dictionary for that partition 403A-C (which may have been generated by TQS 102 after the data partitioning). In some embodiments, different partitions may share a master dictionary.

Processing of SPARQL queries often involves that intermediate results are joined again with the entire knowledge graph table to yield the final result set. This often causes many so-called self-joins. Therefore, this is often one of the most-prominent database operation that needs to be built efficiently.

In some embodiments, if a JOIN operation is to be performed on the different partitions 403A-C with their unique dictionaries, the JOIN may be performed based the identifiers 120A of the tables. However, as illustrated, each dictionary was uniquely generated for that partition (and is not a shared dictionary), and so the same values may have different identifiers 120A in different partitions. For example, "New York" has a ValueId (e.g., identifier 120A) of 2 in partition 403A, and a value of 3 in partition 403B.

In order to account for these ValueID differences in which the same value may have different valueIDs (e.g., identifiers 120A) in different partitions 403A-C, TQS 102 may generate translation tables 422A-F (which may be examples of translation table 122 in FIG. 1). As illustrated, the translation tables 422A-F may indicate what are the identifiers 120A of other tables in different partitions 403A-C that correspond to the identifiers in the current table or partition 403A, as indicated by the dictionaries.

For example, as translation table 422A illustrates, the valueID of 2 which corresponds to the value of "New York" is listed as identifier 3 in partition 403B. Translation table 422A may be a translation table between the dictionary of partition 403A and the dictionary of partition 403B. Translation table 422B may be a translation table between (the dictionary of) partition 403A and (the dictionary of) partition 403C.

In some embodiments, TQS 102 may generate a different translation table 422A-F for each partition 403A-C that is to be joined. In the example illustrated, a JOIN between all three partitions 403A-C may include generating two different translation tables 422A-F for each partition 403A-C. In some embodiments, TQS 102 may generate the translation tables 422A-F prior to receiving or processing the JOIN operation, which may make the JOIN very quick and use very few computing resources to perform, however, storage space may be required to store the generated translation tables 422A-F. In some embodiments, a JOIN using translation tables 422A-F may be beneficial when there are less than a threshold number of tables or partitions to be joined (e.g., during the storage capacity which may be required to store the translation tables 422A-F). In some embodiments, TQS 102 may automatically delete the translation tables 422A-F after the JOIN has been completed, thus freeing up that memory or storage space. With an increasing number of partitions, the number of translation tables increases exponentially. Therefore, this approach is generally used for a smaller number of partitions.

Figure 5:
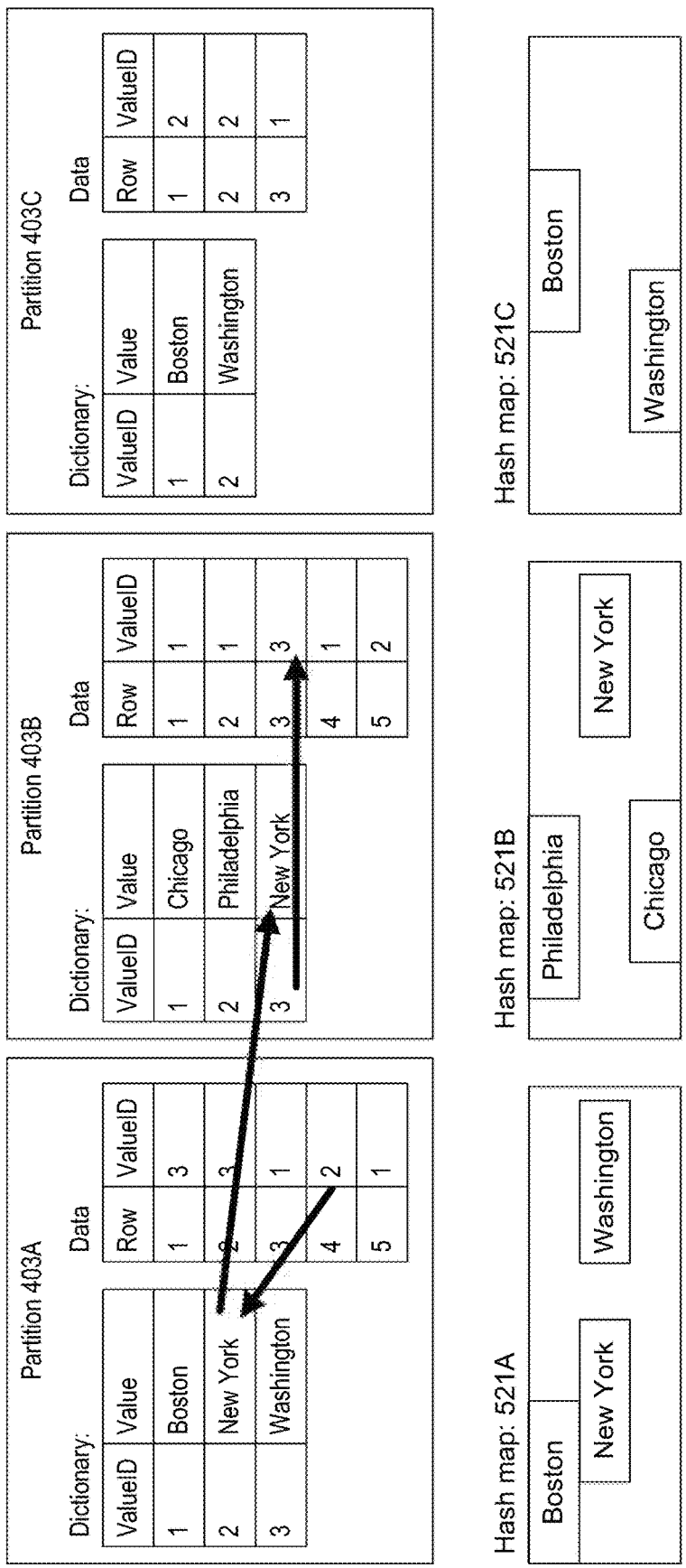
FIG. 5 is a block diagram illustrating an example operations of TQS directed to joining different partitions by value, according to some example embodiments.

FIG. 5 is a block diagram 500 illustrating an example operations of TQS 102 directed to joining different partitions by value 120B (instead of by valueID), according to some example embodiments. As described above with respect to FIG. 4, each of the various partitions 403A-C includes its own dictionary and data tables.

In the example illustrated, a JOIN operation between the partitions 403A-C may be performed by value, which may include TQS 102 generating hash maps 521A-C. For example, TQS 102 may generate a hash value for each value in the dictionary for each partition 403A-C. The hash value for two identical values in two different partitions (e.g., such as the hash for "New York" in partitions 403A and 403B) may be identical even if the corresponding dictionary identifiers 120A are different.

Then for example, based on the number of hash values generate, the most significant bits for those values may be compared to identify which values exist in each partition 403A-C. In the example illustrated, the two most significant bits of the hash values may be compared. However, one of the challenges with generating hash maps 521A-C and performing JOINs using the hash values is that the original values 120B may still consume a lot of memory or storage space in the dictionary for each partition.

FIG. 6 is a block diagram 600 illustrating an example operations of TQS 102 directed to joining different partitions by value using a surrogate identifier, according to some example embodiments. As just noted above with respect to FIG. 5, is that one of the issues with generating a dictionary for each partition 603A-C is that the partition dictionaries may store the original identifier value which may consume a lot of storage space.

In FIG. 6, each partition dictionary includes a value that corresponds to a shared or master dictionary 620 that is used by all of the partitions 603A-C. In the example illustrated, only a portion of the full dictionary 620 is illustrated. Also, the values in the parenthesis inside of each dictionary may be ignored and are provided for ease of understanding only. Rather than including the original value, each partition dictionary may instead include an identifier from master dictionary 620. Then that identifier may be assigned its own identifier for the dictionary of each individual partition 603A-C. This may allow storage space to be saved, because the identifier value is only stored once in master dictionary 620 and not multiple times in each individual partition dictionary.

Similar to what was described above with FIG. 5, TQS 102 may generate a hash map 621A-C for each partition 603A. However the hash maps 621A-C may use the identifier value from the individual partitions 603A-C rather than the original data value. FIG. 6 illustrates a more efficient way of using hash maps 621A-C with the various partitions 603A-C of triple data.

Returning to FIG. 1, in some embodiments TQS 102 may add another column to table 108 for identifying and removing duplicates that may have been imported into table 108 from knowledge graph 110. A duplicate may be any two rows that include identical data across all the columns 112A-C. In some embodiments, TQS 102 may add a primary key column to table 108, which may help identify and eliminate duplicates (because each unique set of values would generate a new key, thus two identical keys would indicate two identical rows of data). In some other embodiments, rather than adding a new column, TQS 102 may execute a DISTINCT command in SQL which may be used to identify and delete duplicates from table 108.

In some embodiments, TQS 102 may provide an override 123 on the operation of some SQL commands when executed against table 108. Override 123 may include a special flag or processing that may be used in lieu of default SQL processing when processing data (e.g., querying, retrieving, loading, modifying) data on table 108. However, database 106 may use default processing on other tables of database 106.

One example of an override 123 is NULL handling. For example, SQL operates in known manners when a value in a table is identified NULL, often returning an error. For example, in two values are to be added together in SQL one of which is the value 3 and the other is NULL, in default SQL processing, the result returned would be NULL or an error. However, with override 123, if the values 3 and NULL are to be added together, the NULL value may be effectively ignored and the result returned would be 3. In other embodiments, override 123 may include other user or system defined ways of handling NULL values in different types of processing (e.g., such as replacing the NULL value with 0 or 1). This override 123 may help prevent database 106 from issuing SQL errors when processing data on table 108-which may produce functionality that is more correspondent to SPARQL or customized system or user needs.

In some embodiments, override 123 may include recursion processing which may allow for shorter commands in performing recursion processing by database 106. Recursion may refer to any repeated querying or processing that is performed on data. For example, identifying all the ancestors (predicate) of a girl named Alice (subject), which would return a set of objects.

Figure 7:
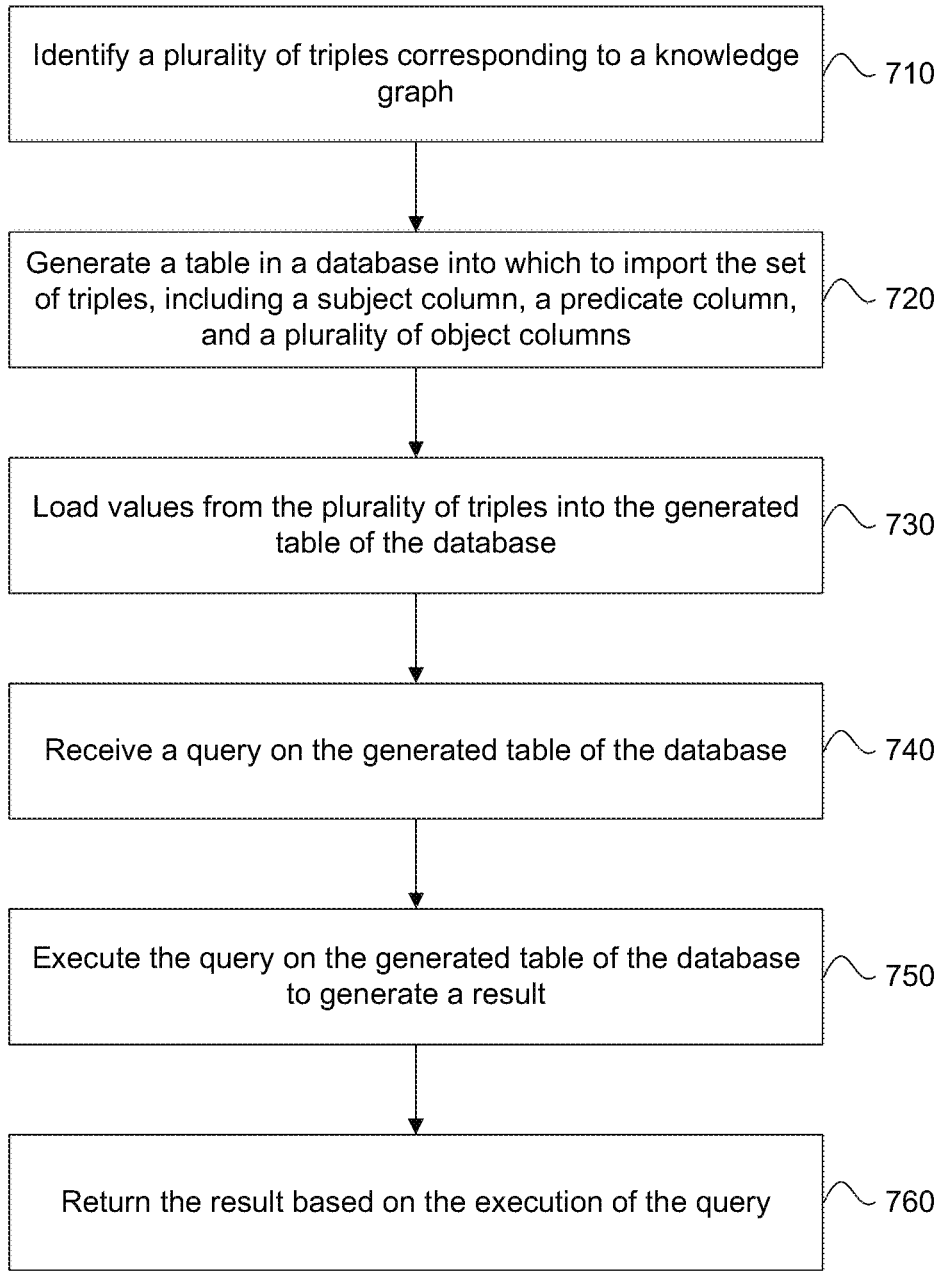
FIG. 7 is a flowchart illustrating a process for integrating triple data into a database, according to some embodiments.

FIG. 7 is a flowchart illustrating a process 700 for integrating triple data into a database 106, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to the figures.

In 710, a plurality of triples corresponding to a knowledge graph are identified. For example, TQS 102 may receive access to a file, such as a knowledge graph 110, include a number of different triples 104 for import into database 106. Each triple 104 may include data corresponding to a predicate 104B that identifies a relationship of a subject 104A, to an object 104C.

In 720, a table in a database into which to import the set of triples is generated. For example, TQS 102 may generate table 108 which may be configured to receive the data of the triples 104. Table 108 may include a subject column 112A and a predicate column 112B of the same datatype (e.g., string), and multiple object columns 112C1-C3 spanning multiple different datatypes 114. Datatypes 114 may indicate which types of data are used across the database 106 or that may be used to import various possible data from object 104C. In some embodiments, each object column 112C1-C3 may be configured to store a different type of data.

In 730, values from the plurality of triples are loaded into the generated table of the database. For example, TQS 102 may import the data from subject 104A, predicate 104B, and object 104C across the triples into various records/row across the corresponding columns of table 108. In some embodiments, TQS 102 may identify a datatype of the data from object 104C and load that data into the corresponding object column 112C1-C3 that is configured to store that same datatype.

In 740, a query is received on the generated table of the database. For example, TQS 102 may receive query 116 which may include a SQL or SPARQL query to be executed against the data of table 108.

In 750, the query is executed on the generated table of the database to generate a result. For example, database 106 may execute the query 116 against table 108 to generate a result 118. In some embodiments, the query 116 may include a query from multiple tables of database 106, including both table 108 and another table without triple formatted data, and database 106 may generate a result 118 combining data from the different tables.

In 760, the result is returned based on the execution of the query. For example, TQS 102 or database 106 may return result 118 of query 116 to the requesting system, process, or user.

Figure 8:
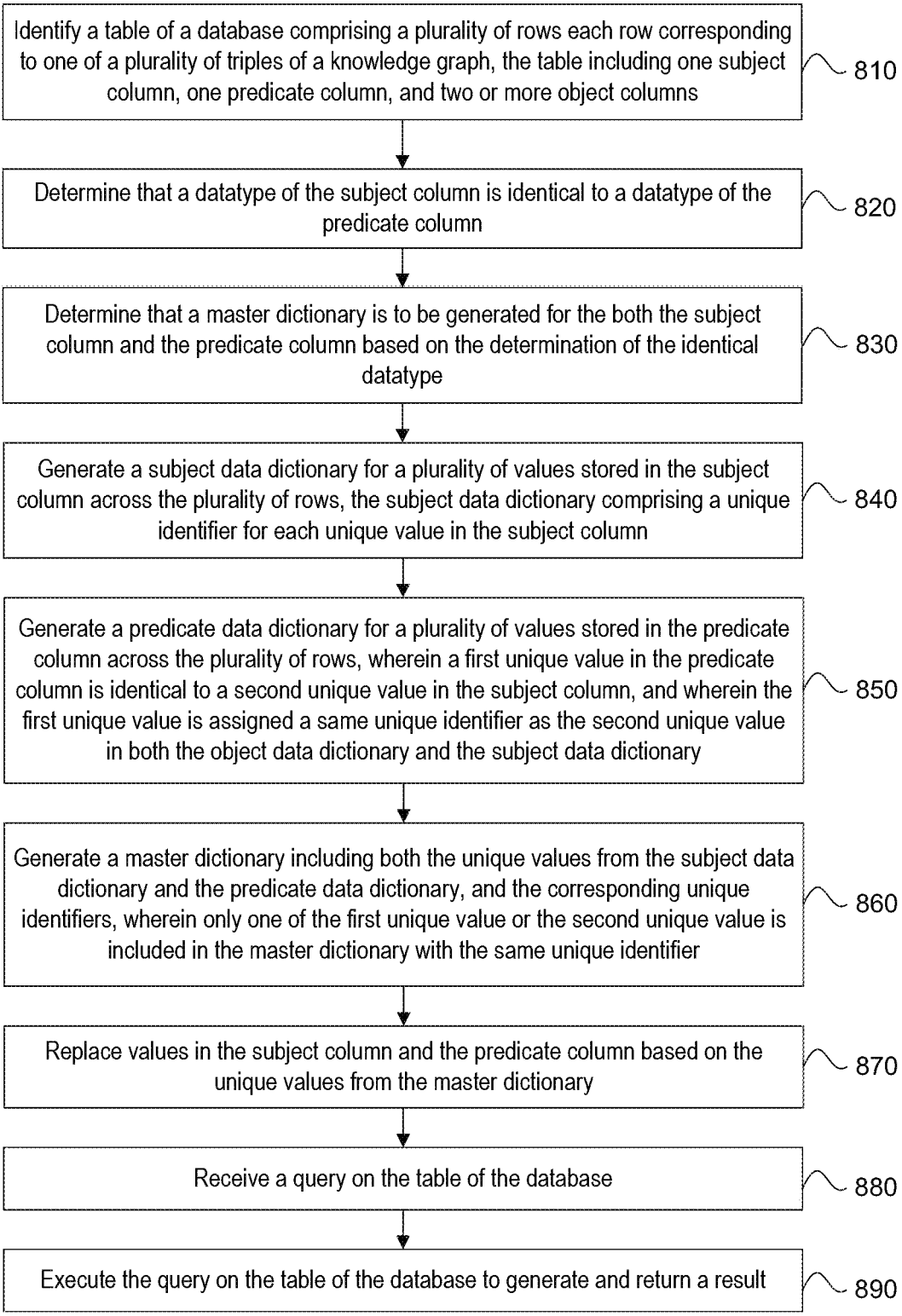
FIG. 8 is a flowchart illustrating a process for using a master dictionary with triple formatted data imported into a database, according to some embodiments.

FIG. 8 is a flowchart illustrating a process 800 for using a master dictionary 120 with triple formatted data imported into a database 106, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Method 800 shall be described with reference to the figures.

In 810, a table of a database comprising a plurality of rows each row corresponding to one of a plurality of triples of a knowledge graph is identified. For example, database 106 or TQS 102 may identify table 108 of database 106 which includes data from triples 104 of knowledge graph 110 loaded into the various columns 112A-C.

In 820, it is determined that a datatype of the subject column is identical to a datatype of the predicate column. For example, TQS 102 may determine that both the subject column 112A and the predicate column 112B share the same datatype, such as String.

In 830, it is determined that a master dictionary is to be generated for the both the subject column and the predicate column based on the determination of the identical datatype. For example, based on identifying that both columns 112A, 112B share the same datatype, TQS 102 may determine that they can share a master dictionary 120 in addition to or in lieu of generating individual dictionaries for each column. The master dictionary 120 may include a dictionary that spans multiple columns in which each unique identifiers 120A for the same values 120B are reused across the different columns.

In 840, a subject data dictionary is generated for a plurality of values stored in the subject column across the plurality of rows, the subject data dictionary comprising a unique identifier for each unique value in the subject column. For example, TQS 102 may generate a subject dictionary 120 for subject column 112A.

In 850, a predicate data dictionary is generated for a plurality of values stored in the predicate column across the plurality of rows, wherein a first unique value in the predicate column is identical to a second unique value in the subject column, and wherein the first unique value is assigned a same unique identifier as the second unique value in both the object data dictionary and the subject data dictionary. For example, TQS 102 may generate a predicate dictionary 120 for predicate column 112B, in which any values from the subject column 112A that appear in the predicate column 112B use the same identifiers 120A as assigned to the values 120B from the subject column 112A.

In 860, a master dictionary including both the unique values from the subject data dictionary and the predicate data dictionary, and the corresponding unique identifiers is generated, wherein only one of the first unique value or the second unique value is included in the master dictionary with the same unique identifier. For example, TQS 102 may generate master dictionary 120 in which the unique values from the subject dictionary and the predicate dictionary are combined and any duplicate values are ignored so they only appear once in the master dictionary 120.

In 870, values in the subject column and the predicate column based on the unique values from the master dictionary. For example, TQS 102 may replace the original values 120B stored in the subject column 112A and the predicate column with their corresponding identifiers 120A from the master dictionary 120.

In 880, a query is received on the generated table of the database. For example, TQS 102 may receive query 116 which may include a SQL or SPARQL query to be executed against the data of table 108.

In 890, the query is executed on the table of the database to generate and return a result. For example, database 106 may execute the query 116 against table 108 to generate a result 118. In some embodiments, the query 116 may include a query from multiple tables of database 106, including both table 108 and another table without triple formatted data, and database 106 may generate a result 118 combining data from the different tables. TQS 102 or database 106 may then return result 118 of query 116 to the requesting system, process, or user.

FIG. 10 illustrates an example block diagram 1000 of two tables of TQS 102, which are queried with SPARQL, according to some embodiments. FIG. 10 illustrates a customers table 1008A and a deliveries table 1008B. As may be seen in the tables, the value in the CustomerID includes overlapping values in each table that allow relationships between records from the tables 1008A-B to be identified or queried.

Code portion 1011 illustrates creating a view called "myView" from the tables 1008A-B in SQL within TQS 102. Code portion 1013 illustrates a SPARQL query that may be written and/or executed by TQS 102 against "myView" (in lieu of using SQL, which would require a longer, more wordy query relative to the SPARQL).

As an extension, such a definition might span a knowledge graph and regular tables. As a consequence, both types of sources could be queries with just one SPARQL query. As an example, consider a shipping or delivery application. Sales orders and deliveries are stored in regular tables, like 1008A and 1008B. Customs and taxation rules on the other hand could be stored in a knowledge graph. When a delivery is to be made from Germany to Switzerland and the item happens to contain alcohol, special taxation rules apply. Using just one SPARQL query, the tax for deliveries from both the knowledge graph and the tables 1008A, 1008B may be queried.

Figure 9:
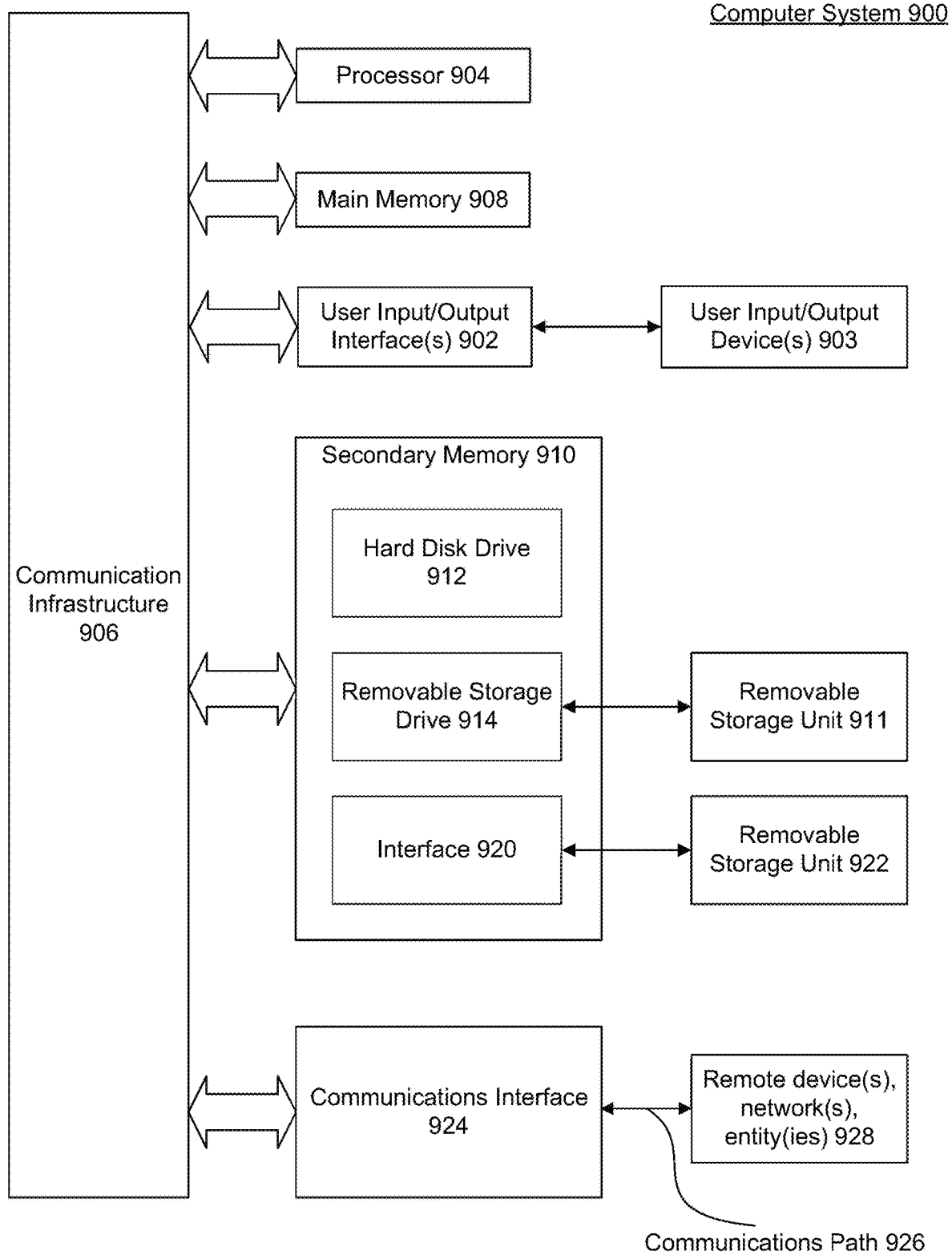
FIG. 9 illustrates an example computer system useful for implementing various embodiments.

Various embodiments and/or components therein can be implemented, for example, using one or more computer systems, such as computer system 900 shown in FIG. 9. Computer system 900 can be any computer or computing device capable of performing the functions described herein.

For example, one or more computer systems 900 can be used to implement any embodiments, and/or any combination or sub-combination thereof.

Computer system 900 includes one or more processors (also called central processing units, or CPUs), such as a processor 904. Processor 904 is connected to a communication infrastructure or bus 906. Computer system 900 may represent or comprise one or more systems on chip (SOC).

One or more processors 904 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 can include one or more levels of cache. Main memory 908 has stored therein control logic (i.e., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 includes a computer usable or readable storage device having stored thereon computer software (control logic) and/or data. Removable storage unit 918 can be a floppy disk, magnetic tape, compact disk, DVD, optical storage disk, memory card, and/any other computer data storage device. Removable storage drive 914 reads from and/or writes to removable storage unit 918 in a well-known manner.

According to an exemplary embodiment, secondary memory 910 can include other means, instrumentalities or other approaches for allowing computer programs and/or other instructions and/or data to be accessed by computer system 900. Such means, instrumentalities or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 can further include a communication or network interface 924. Communication interface 924 enables computer system 900 to communicate and interact with any combination of remote devices, remote networks, remote entities, etc. (individually and collectively referenced by reference number 928). For example, communication interface 924 can allow computer system 900 to communicate with remote devices 928 over communications path 926, which can be wired and/or wireless, and which can include any combination of LANs, WANs, the Internet, etc. Control logic and/or data can be transmitted to and from computer system 900 via communication path 926.

In some embodiments, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   identifying a table of a database, the table comprising a plurality of rows, each row of the plurality of rows corresponding to one of a plurality of triples of a knowledge graph, the table further comprising a plurality of columns configured to store values of one of the plurality of triples in each row of the plurality of rows, the plurality of columns including one subject column, one predicate column, and two or more object columns;
   determining that a datatype of the subject column is identical to a datatype of the predicate column;
   determining that a master dictionary is to be generated for both the subject column and the predicate column based on the determination of the identical datatype;
   generating the master dictionary including both a unique identifier for each unique value in the subject column, and a unique identifier for each unique value in the predicate column;
   replacing values in the subject column and the predicate column based on the unique values from the master dictionary;
   receiving a query on the table;
   executing the query on the table to generate a result; and
   returning the result based on the execution of the query.

2. The method of claim 1, further comprising:
   generating an object data dictionary for a plurality of values stored in a first object column of the plurality of object columns across the plurality of rows, the object data dictionary comprising a unique identifier for each unique value in the first object column.

3. The method of claim 1, further comprising:
   determining that each row of the plurality of rows includes a NULL value in one or more of the two or more object columns.

4. The method of claim 3, wherein at least one of the two or more object columns includes a non-NULL value corresponding to a value for the triple in the row.

5. The method of claim 1, further comprising:
   determining that the table includes two or more partitions, and wherein the generating comprises generating a different dictionary for each partition.

6. The method of claim 5, further comprising:
   performing a join-by-value between the two or more partitions, wherein at least one of the two or more partitions uses the different dictionary of the at least one of the two or more partitions instead of the master dictionary, the performing the join-by-value comprising:
      generating a translation table for each of the two or more partitions to be joined, the translation table indicating a value identifier for each unique value stored in the two or more partitions in accordance with the master dictionary or the different dictionary for that partition.

7. The method of claim 5, further comprising:
   performing a join-by-identifier between the two or more partitions, wherein at least one of the two or more partitions uses the different dictionary of the at least one of the two or more partitions instead of the master dictionary, and wherein the performing the join-by-identifier comprises:
  generating a hash for each value in each master dictionary and the different dictionary; and
  generating a hash map for each partition, wherein the hash map includes the hash for each value.

8. The method of claim 1, wherein a first unique value in the predicate column is identical to a second unique value in the subject column, and wherein only one of the first unique value or the second unique value is included in the master dictionary with a same unique identifier.

9. A system comprising at least one processor, the at least one processor configured to perform operations comprising:
  identifying a table of a database, the table comprising a plurality of rows, each row of the plurality of rows corresponding to one of a plurality of triples of a knowledge graph, the table further comprising a plurality of columns configured to store values of one of the plurality of triples in each row of the plurality of rows, the plurality of columns including one subject column, one predicate column, and two or more object columns;
  determining that a datatype of the subject column is identical to a datatype of the predicate column;
  determining that a master dictionary is to be generated for both the subject column and the predicate column based on the determination of the identical datatype;
  generating the master dictionary including both a unique identifier for each unique value in the subject column, and a unique identifier for each unique value in the predicate column;
  replacing values in the subject column and the predicate column based on the unique values from the master dictionary;
  receiving a query on the table;
  executing the query on the table to generate a result; and
  returning the result based on the execution of the query.

10. The system of claim 9, the operations further comprising:
  generating an object data dictionary for a plurality of values stored in a first object column of the plurality of object columns across the plurality of rows, the object data dictionary comprising a unique identifier for each unique value in the first object column.

11. The system of claim 9, the operations further comprising:
  determining that each row of the plurality of rows includes a NULL value in one or more of the two or more object columns.

12. The system of claim 11, wherein at least one of the two or more object columns includes a non-NULL value corresponding to a value for the triple in the row.

13. The system of claim 9, the operations further comprising:
  determining that the table includes two or more partitions, and wherein the generating comprises generating a different dictionary for each partition.

14. The system of claim 13, the operations further comprising:
  performing a join-by-value between the two or more partitions, wherein at least one of the two or more partitions uses the different dictionary of the at least one of the two or more partitions instead of the master dictionary, the performing the join-by-value comprising:
    generating a translation table for each of the two or more partitions to be joined, the translation table indicating a value identifier for each unique value stored in the two or more partitions in accordance with the master dictionary or the different dictionary for that partition.

15. The system of claim 13, the operations further comprising:
  performing a join-by-identifier between the two or more partitions, wherein at least one of the two or more partitions uses the different dictionary of the at least one of the two or more partitions instead of the master dictionary, and wherein the performing the join-by-identifier comprises:
    generating a hash for each value in each master dictionary and the different dictionary; and
    generating a hash map for each partition, wherein the hash map includes the hash for each value.

16. A non-transitory computer-readable medium having instructions stored thereon that, when executed by at least one computing device, cause the at least one computing device to perform operations comprising:
  identifying a table of a database, the table comprising a plurality of rows, each row of the plurality of rows corresponding to one of a plurality of triples of a knowledge graph, the table further comprising a plurality of columns configured to store values of one of the plurality of triples in each row of the plurality of rows, the plurality of columns including one subject column, one predicate column, and two or more object columns;
  determining that a datatype of the subject column is identical to a datatype of the predicate column;
  determining that a master dictionary is to be generated for both the subject column and the predicate column based on the determination of the identical datatype;
  generating the master dictionary including both a unique identifier for each unique value in the subject column, and a unique identifier for each unique value in the predicate column;
  replacing values in the subject column and the predicate column based on the unique values from the master dictionary;
  receiving a query on the table;
  executing the query on the table to generate a result; and
  returning the result based on the execution of the query.

17. The non-transitory computer-readable medium of claim 16, the operations further comprising:
  generating an object data dictionary for a plurality of values stored in a first object column of the plurality of object columns across the plurality of rows, the object data dictionary comprising a unique identifier for each unique value in the first object column.

18. The non-transitory computer-readable medium of claim 16, the operations further comprising:
  determining that each row of the plurality of rows includes a NULL value in one or more of the two or more object columns.

19. The non-transitory computer-readable medium of claim 18, wherein at least one of the two or more object columns includes a non-NULL value corresponding to a value for the triple in the row.

20. The non-transitory computer-readable medium of claim 16, the operations further comprising:

determining that the table includes two or more partitions, and wherein the generating comprises generating a different dictionary for each partition.

\* \* \* \* \*